Figure 1:
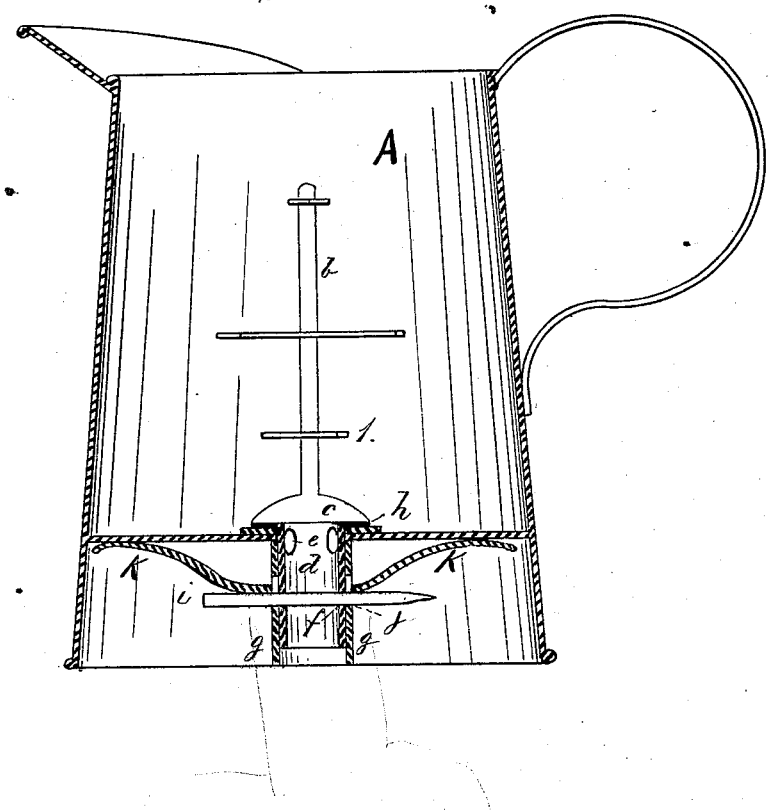

I. W. HOAGLAND.
Measuring-Funnel.

No. 160,017. Patented Feb. 23, 1875.

UNITED STATES PATENT OFFICE.

ISAAC W. HOAGLAND, OF NEWARK, NEW JERSEY.

IMPROVEMENT IN MEASURING-FUNNELS.

Specification forming part of Letters Patent No. 160,017, dated February 23, 1875; application filed January 27, 1875.

*To all whom it may concern:*

Be it known that I, ISAAC W. HOAGLAND, of the city of Newark, in the county of Essex and State of New Jersey, have invented certain new and useful Improvements in Graduating Measures Combined with Funnels; and I do hereby declare that the following is a full, clear, and exact description thereof, which will enable others skilled in the art to which it pertains to make and use the same, reference being had to the accompanying drawings and to the letters of reference marked thereon, which form a part of this specification.

This invention relates to certain improvements in liquid-measures; and consists in the employment and use of a device by means of which a measure of a given capacity may be used to measure accurately any quantity less than its full capacity, and also to make it discharge its contents in a bottle or other vessel without using a funnel by causing said contents to be discharged through the bottom of the measure automatically, all of which will be hereinafter more fully set forth.

The measure A is supplied with a vertical post, $b$, having, at its lower extremity, a flange, $c$, to which is secured a pipe, $d$, having suitable perforations $e$ in close proximity to said flange $c$, and also perforations $f$ in opposite sides of said pipe, for purposes hereinafter set forth. In the bottom of the measure A is also a slotted pipe, $g$, projecting downward from the center thereof, and in which the pipe $d$ is inserted, being made to fit nicely the flange $c$, which is supplied with a suitable packing, $h$, and forming a close joint on the bottom of the measure, thereby preventing the escape of its contents. In order to insure the latter result a pin, $i$, is inserted through the slots $j$ and perforations $f$, between which and the bottom of the measure is interposed a spring, K, the tendency of which is to keep the flange $c$ firmly pressed against the bottom until purposely released to let the liquid escape, which is done by inserting the pipe $d$ into the neck of a bottle or jug until the pin $i$ comes in contact therewith, when, by pressing downward on the measure, the flange $c$, by means of the slots $j$ in the pipe $g$, is forced upward when the liquid flows out through the apertures $e$ in the pipe $d$ into said bottle, as will be readily understood, and the use of a funnel thereby dispensed with.

The vertical post $b$, as will be seen is provided with suitable gage-strips 1 (as many as may be desired) secured thereto at proper intervals or points to indicate the quantity of liquid in the measure. Thus in a gallon measure may be accurately measured a pint, quart, half-gallon, &c., instead of using several separate measures, and the contents discharged in a jug or bottle without the use of a funnel, as above set forth.

Provision may be made in the side of the measure to see the contents in the usual manner, if desired.

Having thus described my invention, what I claim as new, and desire to secure by Letters Patent of the United States, is—

In a liquid-measure, the combination of the post $b$, having the gage-strips 1, the pipe $d$, having the perforations $e$ and $f$, and the slotted pipe $g$, when operating substantially as and for the purposes set forth and shown.

In testimony that I claim the foregoing as my own invention I affix hereto my signature in presence of two witnesses.

ISAAC W. HOAGLAND.

Witnesses:
E. J. WARNER,
GEO. H. WILSON.